(12) United States Patent
Zhang et al.

(10) Patent No.: US 12,715,999 B2
(45) Date of Patent: Aug. 25, 2026

(54) AQUEOUS DISPERSION OF OPACIFYING PIGMENT PARTICLES

(71) Applicant: Rohm and Haas Company, Collegeville, PA (US)

(72) Inventors: Qing Zhang, Collegeville, PA (US); Andrew J. Swartz, Fleetwood, PA (US); Michael W. Leonard, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 885 days.

(21) Appl. No.: 17/921,182

(22) PCT Filed: Apr. 16, 2021

(86) PCT No.: PCT/US2021/027659
§ 371 (c)(1),
(2) Date: Oct. 25, 2022

(87) PCT Pub. No.: WO2021/225769
PCT Pub. Date: Nov. 11, 2021

(65) Prior Publication Data

US 2023/0167309 A1 Jun. 1, 2023

Related U.S. Application Data

(60) Provisional application No. 63/021,919, filed on May 8, 2020.

(51) Int. Cl.

| | |
|---|---|
| ***C08F 265/02*** | (2006.01) |
| ***C08F 265/00*** | (2006.01) |
| ***C09D 5/02*** | (2006.01) |
| ***C09D 7/40*** | (2018.01) |
| ***C09D 7/45*** | (2018.01) |
| ***C09D 7/61*** | (2018.01) |
| ***C09D 7/65*** | (2018.01) |
| ***C09D 125/14*** | (2006.01) |

(52) U.S. Cl.
CPC ............ *C09D 5/022* (2013.01); *C08F 265/00* (2013.01); *C08F 265/02* (2013.01); *C09D 7/45* (2018.01); *C09D 7/61* (2018.01); *C09D 7/65* (2018.01); *C09D 7/68* (2018.01); *C09D 7/70* (2018.01); *C09D 125/14* (2013.01)

(58) Field of Classification Search
CPC ............................ C08F 265/00; C08F 265/02
See application file for complete search history.

(56) References Cited

U.S. PATENT DOCUMENTS

| | | | | |
|---|---|---|---|---|
| 4,427,836 | A * | 1/1984 | Kowalski | C09D 7/70 525/902 |
| 4,920,160 | A * | 4/1990 | Chip | C09D 151/003 521/64 |
| 6,020,435 | A | 2/2000 | Blankenship et al. | |
| 6,139,961 | A * | 10/2000 | Blankenship | C08F 265/04 521/65 |
| 7,629,414 | B2 | 12/2009 | Bardman et al. | |
| 7,691,942 | B2 | 4/2010 | Bardman et al. | |
| 7,939,572 | B2 | 5/2011 | Bardman et al. | |
| 8,445,559 | B2 | 5/2013 | Bardman | |
| 9,636,706 | B2 | 5/2017 | Jiang et al. | |
| 10,377,914 | B2 | 8/2019 | Kehrloesser et al. | |
| 2010/0040790 | A1 | 2/2010 | Elizalde et al. | |
| 2013/0052454 | A1 | 2/2013 | Donovan et al. | |
| 2020/0071439 | A1 | 3/2020 | Bardman et al. | |

FOREIGN PATENT DOCUMENTS

| | | | |
|---|---|---|---|
| EP | 1911881 | A1 | 4/2008 |
| EP | 2161304 | A1 | 3/2010 |
| EP | 3031837 | A1 | 6/2016 |
| EP | 3144355 | A1 | 3/2017 |

* cited by examiner

*Primary Examiner* — Vickey Nerangis

(57) ABSTRACT

The present invention relates to a waterborne composition comprising an aqueous dispersion of first and second multistage polymer particles, wherein each of the first and second polymer particles comprises a water-occluded core and a high $T_g$ polymeric shell wherein the second multistage polymer particles further comprise a polymeric binder layer superposing the shell. The composition of the present invention is useful for reducing the load of $TiO_2$ in paint formulations, while producing coatings with excellent hiding and scrub resistance.

12 Claims, No Drawings

AQUEOUS DISPERSION OF OPACIFYING PIGMENT PARTICLES

BACKGROUND OF THE INVENTION

The present invention relates to an aqueous dispersion of opacifying pigment particles. The composition of the present invention is useful for reducing loading of inorganic pigments such as titanium dioxide in paint formulations, while maintaining or improving hiding.

Titanium oxide ($TiO_2$) is the mostly commonly used opacifying pigment in the paint industry due to its very high refractive index. Nevertheless, $TiO_2$, is the most expensive component in paint; moreover, its manufacture requires high energy consumption and poses potential environmental hazardous risks. As regulatory agencies around the world are promoting legislation designed to place warning labels on products containing $TiO_2$, an additional urgency for greatly reducing the concentration of $TiO_2$ in consumer products such as architectural paints has arisen.

Acceptable opacifying performance (hiding) in paints can be achieved in the absence of $TiO_2$, by substituting $TiO_2$ with large amounts of extender to obtain above-critical pigment volume concentration formulations. However, inasmuch as acceptable opacity is achieved through the creation of air voids arising from insufficient binder to form effective films, the resultant coating suffers from poor scrub resistance.

Although opacifying performance can also be enhanced by addition of opaque polymer particles, the ability of these organic opacifying agents to boost opacity is limited by their inherently lower index of refraction with concomitant inferior coating properties at high concentrations. Consequently, opaque polymer particles are not a substitute for $TiO_2$; their usage has been limited to an ancillary role to reduce the loading of $TiO_2$ required to achieve acceptable hiding and maintain performance in architectural coatings.

Accordingly, it would be an advance in the art to discover a pigmented coating composition that is substantially free of $TiO_2$ with acceptable hiding and scrub resistance performance.

SUMMARY OF THE INVENTION

This invention addresses a need in the art by providing a waterborne composition comprising an aqueous dispersion of first and second multistage polymer particles, wherein each of the first and second polymer particles comprises:

a) a water-occluded core comprising from 20 to 60 weight percent structural units of a salt of a carboxylic acid monomer and from 40 to 80 weight percent structural units of a nonionic monoethylenically unsaturated monomer; and b) a polymeric shell having a $T_g$ in the range of from 60° C. and 120° C.;

wherein the second multistage polymer particles further comprise:

c) a polymeric binder layer superposing the shell, which polymeric binder layer has a $T_g$ of not greater than 35° C. and comprises structural units of at least one monoethylenically unsaturated monomer;

wherein the weight-to-weight ratio of structural units of monomers in the water-occluded core to the shell in the first and second multistage polymer particles is in the range of 1:10 to 1:20;

the weight-to-weight ratio of the polymer binder to the sum of the shell and the structural units of monomers in the core in the second multistage polymer particles is in the range of 1:1 to 3.5:1;

the weight-to-weight ratio of the first multistage polymer particles to the second multistage polymer particles is in the range of from 0.15:1 to 1.0:1;

the z-average particle size of the first polymer particles is in the range of from 200 nm to 2000 nm; and the z-average particle size of the second polymer particles is in the range of from 300 nm to 750 nm.

The present invention addresses a need in the art by providing a composition that substantially reduces, and in some instances, eliminates the requirement of $TiO_2$ as an opacifying pigment in paint formulations.

DETAILED DESCRIPTION OF THE INVENTION

The present invention is a waterborne composition comprising an aqueous dispersion of first and second multistage polymer particles, wherein each of the first and second polymer particles comprises:

a) a water-occluded core comprising from 20 to 60 weight percent structural units of a salt of a carboxylic acid monomer and from 40 to 80 weight percent structural units of a nonionic monoethylenically unsaturated monomer; and b) a polymeric shell having a $T_g$ in the range of from 60° C. and 120° C.;

wherein the second multistage polymer particles further comprise:

c) a polymeric binder layer superposing the shell, which polymeric binder layer has a $T_g$ of not greater than 35° C. and comprises structural units of at least one monoethylenically unsaturated monomer;

wherein the weight-to-weight ratio of structural units of monomers in the water-occluded core to the shell in the first and second multistage polymer particles is in the range of 1:10 to 1:20;

the weight-to-weight ratio of the polymer binder to the sum of the shell and the structural units of monomers in the core in the second multistage polymer particles is in the range of 1:1 to 3.5:1;

the weight-to-weight ratio of the first multistage polymer particles to the second multistage polymer particles is in the range of from 0.15:1 to 1.0:1;

the z-average particle size of the first polymer particles is in the range of from 200 nm to 2000 nm; and the z-average particle size of the second polymer particles is in the range of from 300 nm to 750 nm.

The water-occluded core comprises from 20, preferably from 25, more preferably from 30, and most preferably from 32 weight percent, to 60, preferably to 50, more preferably to 40, and most preferably 36 weight percent structural units of a salt of a carboxylic acid monomer based on the weight of structural units of monomers in the core.

As used herein, the term “structural units” refers to the remnant of the recited monomer after polymerization. For example, a structural unit of a salt of methacrylic acid, where $M^+$ is a counterion, preferably a lithium, sodium, or potassium counterion, is as illustrated:

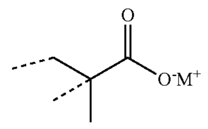

structural unit of a salt of methacrylic acid

Examples of suitable carboxylic acid monomers include acrylic acid, methacrylic acid, itaconic acid, and maleic acid.

The water-occluded core further comprises from 40, preferably from 50, more preferably from 55, more preferably from 60, and most preferably from 64 weight percent to 80, preferably to 75, more preferably to 70, and most preferably to 68 weight percent structural units of a nonionic monoethylenically unsaturated monomer based on the weight of structural units of monomers in the core. Examples of nonionic monoethylenically unsaturated monomers include one or more acrylates and/or methacrylates such as methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and one or more monoethylenically unsaturated aromatic compounds such as styrene, α-methylstyrene, and 4-t-butylstyrene. A preferred nonionic monoethylenically unsaturated monomer is methyl methacrylate.

The polymeric shell of the first and second polymer particles preferably has a $T_g$ in the range of not less than 80° C., more preferably not less than 90° C., and most preferably not less than 95° C., and preferably not greater than 115° C., and most preferably not greater than 110° C. As used herein, $T_g$ refers to the glass transition temperature as calculated by the Fox equation.

Preferably, the shells of the first and second polymer particles comprise structural units of methyl methacrylate, styrene, α-methylstyrene, isobornyl methacrylate, lauryl methacrylate, or cyclohexyl methacrylate. In one embodiment, the shell comprises at least 80, more preferably at least 90, and most preferably at least 95 weight percent structural units of styrene. In another embodiment, the shell comprises from 89 to 93 weight percent structural units of styrene and from 7 to 11 weight percent structural units of any or all of methyl methacrylate (4 to 5 weight percent), cyclohexyl methacrylate (0.9 to 2 weight percent), methacrylic acid (2 to 3 weight percent), and the multiethylenically unsaturated monomer, allyl methacrylate (ALMA, 0.1 to 0.5 weight percent).

The polymeric shells of the first and second polymer particles may also further comprise structural units of other multiethylenically unsaturated monomers such as divinyl benzene (DVB), trimethylolpropane trimethacrylate (TMPTMA), or trimethylolpropane triacrylate (TMPTA).

As used herein, "polymeric binder" refers to a polymeric material that is film forming on a desired substrate, with or without a coalescent. In one aspect, the $T_g$ of the polymeric binder as calculated by the Fox equation is not greater than 25° C.; in another aspect, not greater than 15° C., in another aspect, not greater than 10° C., and in another aspect not less than −20° C., and in another aspect not less than −10° C.

Examples of suitable polymeric binder materials include acrylic, styrene-acrylic, vinyl esters such as vinyl acetate and vinyl versatates, and vinyl ester-ethylene polymeric binders. Acrylic binders comprising structural units of methyl methacrylate and structural units of one or more acrylates such as methyl acrylate, ethyl acrylate, n-butyl acrylate, or 2-ethylhexyl acrylate, are especially preferred, as are styrene-acrylic binders.

Preferably, the weight-to-weight ratio of structural units of monomers of the core to the shell in the first and second multistage polymer particles is in the range of 1:12 to 1:16. Preferably, the weight-to-weight ratio of the polymer binder to the sum of the structural units of monomers of the core and the shell in the second multistage polymer particles is in the range of from 1.2:1, more preferably from 1.5:1, and most preferably from 1.8:1, to preferably 3.0:1, more preferably to 2.5:1, and most preferably to 2.2:1.

Preferably, the weight-to-weight ratios of the first multistage polymer particles to the second multistage polymer particles is in the range of from 0.30:1, more preferably from 0.40:1, more preferably from 0.50:1, and most preferably from 0.55:1, to preferably 0.9:1, more preferably to 0.80:1, more preferably from 0.70:1, and most preferably to 0.65:1.

In one aspect, the z-average particle size of the first polymer particles is preferably in the range of from 950 nm to 2000 nm; in another aspect, the z-average particle size of the first polymer particles is preferably in the range of from 300 nm, more preferably from 350 nm, and most preferably from 375 nm, to preferably 600 nm, more preferably to 500 nm, and most preferably to 425 nm. As used herein, z-average particle size refers to particle size as determined by dynamic light scattering, for example by a BI-90 Plus Particle Size Analyzer (Brookhaven).

The z-average particle size of the second polymer particles is in the range of from 400 nm, more preferably from 450 nm, most preferably from 475 nm, to preferably 700 nm, more preferably 600 nm, and most preferably to 550 nm.

The composition of the present invention can be conveniently prepared by mixing an aqueous dispersion of first multistage polymer particles with an aqueous dispersion of second multistage polymer particles. The aqueous dispersion of first multistage polymer particles can be prepared by methods known in the art, for example, as disclosed in U.S. Pat. No. 6,020,435 and US 2020/0071439 A1. Examples of commercially available dispersions of first multistage polymer particles include ROPAQUE™ Ultra Opaque Polymers, AQACell HIDE 6299 Opaque Polymers, and ROPAQUE™ TH-2000 Hollow Sphere Pigments. (ROPAQUE is a Trademark of The Dow Chemical Company or its Affiliates.) The aqueous dispersion of second multistage polymer particles can be prepared as described in U.S. Pat. No. 7,691,942 B2. An example of a preferred method of preparing the dispersion of second multistage polymer particles is shown in Intermediate Example of the Example section.

The aqueous dispersion of the first and second multistage polymer particles of the present invention form opaque polymer particles or hollow sphere polymer particles (also known OPs or HSPs) upon application of the dispersion onto a substrate followed by evaporation of the water occluded in the core. As such, the composition of the present invention is useful as opacifiers and binders in paint formulations, especially paint formulations where it is desirable to reduce, and even eliminate the loading of $TiO_2$. It has surprisingly been discovered that the combination of binder coated opaque polymer particles and non-binder coated opaque polymer particles gives superior hiding and scrub resistance, as compared to a dispersion containing opaque polymer particles and distinct binder particles that do not superpose the opaque polymers.

The composition may include other materials such as rheology modifiers, dispersants, defoamers, surfactants, coalescents, extenders, and inorganic pigments. $ZnO_2$ is a particularly useful pigment that can be used as a replacement for $TiO_2$—and a supplement or partial replacement for the first and second multistage polymer particles—in the composition of the present invention. Preferably, the composition of the present invention comprises less than 1 weight percent $TiO_2$. In another aspect, the composition comprises 0 weight percent $TiO_2$.

Kubelka-Munk Scattering Coefficient (S/Mil) Calculation

The hiding performance was characterized by the S/mil as follows. Three draw-downs were prepared using a 1.5-mil Bird draw down bar and one draw-down was prepared using a 25 mil Bird draw down bar for each paint on Black Release Charts. The drawdowns were allowed to dry overnight. Using a template, 3.25"×4" rectangles were cut out with an X-ACTO knife on each chart. Five replicated-reflectance measurements were collected using a XRite reflectometer in each of the scribed areas. The y-reflectance was measured in five different areas of the draw down and the average y-reflectance recorded. Kubelka-Munk hiding value S is given by $$S = \frac{R}{X \times (1 - R^2)} \times \ln \frac{1 - (R_B \times R)}{1 - \frac{R_B}{R}}$$

Where X is the average film thickness of the thin films, R is the average reflectance of the thick film (25 mil) and RB is the average reflectance over black of the thin film (1.5 mil). X can be calculated from the weight of the film ($W_{pf}$), the density (D) of the dry film; and the film area (A). Film area for a 3.25"×4" template was 13 $in^2$.

$$X \text{ (mils)} = \frac{W_{pf} \text{ (g)} \times 1000 \text{ (mil/in)}}{D \text{ (lbs/gal)} \times 1.964 \text{ (g/in}^3\text{/lbs/gal)} \times A \text{ (in)}}$$

Scrub Resistance Measurements

The scrub resistance test was based on the ISO 11998. Drawdowns were made on black vinyl scrub charts with a 20-mil Dow applicator in a controlled temperature and humidity room and then dried for 7 d. The drawdown charts were weighed before and after the scrub test (and dried overnight) to determine the weight loss on an analytical balance before the scrub test was run. The scrub test was run on a Pacific Scientific Abrasion Tester using 0.25% DS-4 as scrub media and Scotch Brite 7448+ Ultra Fine Hand Pad as the scrub pad. Prior to the test, the scrub media was spread on the coating surface with a soft brush, and the scrub pad was saturated with the scrub media to a final total mass of 4 g. The scrub test was run for 200 cycles, immediately after which the scrubbed panel was rinsed with water. The panel was allowed to dry overnight and the charts were re-weighed. The weight loss was then used to calculate the film thickness loss.

PVC Calculation

Pigment volume concentrations are calculated by the following formula:

$$PVC = \left[ \frac{Vol \text{ Pigment} + \text{Extender} + OP}{Vol \text{ Pigment} + \text{Extender} + OP + \text{Binder Solids}} \right] \times 100$$

where binder solids refers either to the contribution of polymer from the styrene-acrylic binder layer of the Intermediate Example, or to binder from Acronal S 559 Styrene Acrylic Binder, or both. OP refers to the contribution of the volumes of the first multistage polymer particles and the core:shell portion of the second multistage polymer particles.

EXAMPLES

Intermediate Example—Preparation of an Aqueous Dispersion of Binder Coated Multistage Polymer Particles In the following Example, Core #1 refers to an aqueous dispersion of polymer particles (66 MMA/34 MAA, solids 31.9%, z-average particle size of 135 nm) prepared substantially as described in U.S. Pat. No. 6,020,435.

A 5-liter, four necked round bottom flask was equipped a paddle stirrer, thermometer, $N_2$ inlet and reflux condenser. DI water (475 g) was added to the kettle and heated to 89° C. under $N_2$. Sodium persulfate (NaPS, 3 g in 25 g water) was added to vessel immediately followed by Core #1 (125 g). Monomer emulsion 1 (ME 1), which was prepared by mixing DI water (125.0 g), Disponil FES-32 emulsifier (10.0 g), styrene (424.2 g), methacrylic acid (7.0 g), linseed oil fatty acid (2.8 g), acrylonitrile (112.0 g), and divinyl benzene (14.0 g), was then added to the kettle over 60 min. The temperature of the reaction mixture was allowed to increase to 84° C. after 15 min and allowed to increase to 92° C. after 25 min. Upon completion of the ME 1 feed, the reaction was cooled to 60° C.

When the kettle temperature reached 80° C., an aqueous mixture of ferrous sulfate and EDTA (20 g, 0.1 wt. % FeSat, 1 wt. % EDTA) was added to the kettle. When the kettle temperature reached 60° C., co-feeds including a solution of t-butylhydroperoxide (t-BHP 1.9 g) and NaPS (5.0 g) mixed with DI water (100 g), along with a separate solution of isoascorbic acid (IAA, 2.6 g in 100 g water) were both added simultaneously to the kettle at a rate of 1.20 g/min.

Two min after the charging of the co-feed solutions, ME 2, which was prepared by mixing DI water (240 g), Disponil FES-32 emulsifier (17.0 g), butyl acrylate (431.46 g), methyl methacrylate (430.54 g), 2-ethylhexyl acrylate (124.44 g), acetoacetoxyethyl methacrylate (25.5 g) and methacrylic acid (7.96 g), was added to the kettle over 60 min while allowing the temperature to rise to 86° C. without providing any external heat. Upon completion of ME 2 addition, the co-feed solutions were stopped and the batch was held for 5 min at 80-86° C. A solution of $NH_4OH$ (5 g, 28 wt. % aq.) mixed with DI water (5.0 g) was then added to the kettle along with hot (90° C.) DI water (175 g).

ME 3, which was prepared by mixing DI water (54.0 g), Disponil FES-32 emulsifier (3.0 g), butyl acrylate (104.4 g), methyl methacrylate (75.6 g), and 4-hydroxy TEMPO (3.0 g), was fed to the kettle over 5 min. Immediately after the ME 3 feed addition was complete, $NH_4OH$ (35.0 g, 28 wt. % aq.) mixed with DI water (35 g) was added to the kettle over 2 min. When $NH_4OH$ addition was complete, the batch was held for 5 min. The addition the co-feed solutions was resumed at 1.2 g/min until completion, whereupon the dispersion was cooled to 25° C. While cooling, additional co-feeds including a solution of t-BHP (1.5 g) in DI water (25 g), along with a separate solution of IAA (0.7 g) in water (25 g) were both added simultaneously to the kettle at a rate of 1.30 g/min. Upon completion of addition of the second co-feed, the dispersion was filtered to remove any coagulum. The filtered dispersion had a solids content of 48.7%. The S/Mil was measured to be 1.03 with collapse of 0.0%.

Table 1 illustrates paint formulations with first and second multistage polymer particles. In the following Table, Opaque Polymer refers to ROPAQUE™ Ultra EF Opaque Polymer (30 wt. % solids), Defoamer refers to Foamstar A34 Defoamer, Coalescent refers to Texanol Coalescent, Thickener refers to Natrosol 250 MHR Thickener, $ZnO_2$ refers to ZOCO 101 $ZnO_2$, Extender refers to and Dispersant refers to TAMOL™ 851 Dispersant. (TAMOL is a Trademark of The Dow Chemical Company or its Affiliates. In each formulation, the volume solids was 31.8%.

TABLE 1

| Example Paint Formulations 1-3 | | | |
|---|---|---|---|
| Ingredients (g) | Ex. 1 | Ex. 2 | Ex. 3 |
| Intermediate 1 | 324.75 | 324.84 | 325.09 |
| Opaque Polymer | 321.09 | 288.82 | 256.90 |
| Water | 218.82 | 173.34 | 126.21 |
| Defoamer | 0.71 | 0.71 | 0.71 |
| Coalescent | 12.70 | 12.20 | 11.72 |
| Thickener | 145.08 | 145.12 | 145.23 |
| Water | — | 58.92 | 119.04 |
| ZnO | — | 88.03 | 176.19 |
| Dispersant | — | 2.93 | 5.87 |
| Property | | | |
| Total Volume (mL) | 1000.00 | 1000.00 | 1000.00 |
| Total Weight (g) | 1023.16 | 1094.92 | 1166.96 |
| Total PVC | 70.00 | 70.00 | 70.00 |
| ZnO PVC | 0.00 | 5.00 | 10.00 |
| Opaque Polymer PVC | 50.00 | 45.00 | 40.00 |
| Intermediate 1 PVC | 20.00 | 20.00 | 20.00 |

Tables 2A and 2B illustrates the comparative paint formulations. Binder refers to Acronal S 559 Styrene Acrylic Binder (50 wt. % solids), $TiO_2$ refers to Kronos 4311 $TiO_2$ slurry (76.5 wt. %) and Extender refers to Omyacarb UF $CaCO_3$ extender.

TABLE 2A

| Paint Formulations for Comparative Example Paint Formulations 1-3. | | | |
|---|---|---|---|
| Ingredients (g) | C. Ex. 1 | C. Ex. 2 | C. Ex. 3 |
| Binder | 282.76 | 282.91 | 282.56 |
| Opaque Polymer | 267.65 | 241.19 | 214.06 |
| Water | 178.50 | 139.07 | 101.20 |
| Defoamer | 0.60 | 0.60 | 0.60 |
| Thickener | 121.06 | 121.17 | 121.02 |
| Water | — | 49.66 | 99.20 |
| ZnO | — | 73.50 | 146.81 |
| Dispersant | — | 2.45 | 4.89 |
| Property | | | |
| Total Vol (mL) | 1000.00 | 1000.00 | 1000.00 |
| Total Wt (g) | 850.57 | 910.55 | 970.34 |
| Total PVC | 50.00 | 50.00 | 50.00 |
| ZnO PVC | 0.00 | 5.00 | 10.00 |
| OP PVC | 50.00 | 45.0 | 40.00 |

TABLE 2B

| Formulations for Comparative Example Paint Formulations 4-7 | | | | |
|---|---|---|---|---|
| Ingredients (g) | C. Ex. 4 | C. Ex. 5 | C. Ex. 6 | C. Ex. 7 |
| Binder | 169.51 | 169.39 | 169.47 | |
| Intermediate 1 | — | — | — | 289.46 |
| Water | 157.51 | 143.55 | 134.87 | 113.03 |
| Dispersant | 11.68 | 12.06 | 12.45 | 7.79 |
| Extender | 502.26 | 465.74 | 430.06 | 334.99 |
| $TiO_2$ | | 68.91 | 137.87 | — |
| Defoamer | 0.82 | 0.82 | 0.82 | 0.82 |
| Coalescent | | 0.00 | 0.00 | 7.00 |
| Thickener | 257.10 | 256.93 | 257.04 | 256.97 |
| Water | 59.51 | 57.42 | 49.24 | 50.87 |
| Property | | | | |
| Total Volume (mL) | 1000.00 | 1000.00 | 1000.00 | 1000.00 |
| Total Weight (g) | 1158.39 | 1174.82 | 1191.83 | 1060.94 |
| Total PVC | 70.00 | 70.00 | 70.00 | 68.00 |
| $TiO_2$ PVC | 0.00 | 5.00 | 10.00 | 0.00 |
| Extender PVC | 70.00 | 65.00 | 60.00 | 46.60 |
| Intermediate 1 PVC | 0.00 | 0.00 | 0.00 | 21.40 |

TABLE 3

| illustrates S/mil and scrub resistant data for the Example and Comparative Example paint formulations. | | |
|---|---|---|
| Ex. No. | S/mil | Film loss (μm) |
| Ex. 1 | 4.87 | 3.5 |
| Ex. 2 | 6.12 | 4.4 |
| Ex. 3 | 7.43 | 6.9 |
| Comp. Ex. 1 | 2.42 | 3.5 |
| Comp. Ex. 2 | 2.61 | 8.7 |
| Comp. Ex. 3 | 2.71 | 10.7 |
| Comp. Ex. 4 | 2.3 | 42.2 |
| Comp. Ex. 5 | 5.19 | 43.9 |
| Comp. Ex. 6 | 7.02 | 35.8 |
| Comp. Ex. 7 | 3.19 | 22.3 |

The data show excellent hiding and scrub resistance for paint formulations containing dispersions of first and second multistage polymer particles (Opaque Polymer and Intermediate 1), as compared to comparative example formulations that are missing one or both types of opacifying pigments. The data further demonstrate that formulations containing $ZnO_2$, in combination with the opaque polymer and Intermediate 1 (Examples 2 and 3) show superior hiding and scrub resistance to formulations containing $TiO_2$ and binder that does not superpose the opaque polymer particles.

The invention claimed is:

1. A waterborne composition comprising an aqueous dispersion of first and second multistage polymer particles, wherein each of the first and second multistage polymer particles comprises:

a) a water-occluded core comprising from 30 to 50 weight percent structural units of a salt of methacrylic acid and from 50 to 70 weight percent structural units of a nonionic monoethylenically unsaturated monomer, based on the weight of structural units of monomers in the water-occluded core, wherein the nonionic monoethylenically unsaturated monomer is one or more acrylates or methacrylates selected from the group consisting of as methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and a monoethylenically unsaturated aromatic compound selected from the group consisting of styrene, α-methylstyrene, and 4-t-butylstyrene; and b) a polymeric shell having a $T_g$ in the range of from 90° C. to 115° C., wherein the polymeric shell comprises from 89 to 93 weight percent structural units of styrene, from 4 to 5 weight percent structural units of methyl methacrylate, from 0.9 to 2 weight percent structural units of cyclohexyl methacrylate, from 2 to 3 weight percent structural units of methacrylic acid, and from 0.1 to 0.5 weight percent structural units of allyl methacrylate;

wherein the second multistage polymer particles further comprise:

c) a layer of a film forming polymeric binder superposing the polymeric shell, which film forming polymeric binder has a $T_g$ in the range of from −20° C. to 15° C. and comprises structural units of at least one monoethylenically unsaturated monomer, wherein the film forming polymeric binder is an acrylic or styrene acrylic binder;

wherein the weight-to-weight ratio of structural units of monomers in the water-occluded core to the polymeric shell in the first and second multistage polymer particles is in the range of 1:10 to 1:20;

the weight-to-weight ratio of the film forming polymeric binder to the sum of the polymeric shell and the structural units of monomers in the water-occluded core in the second multistage polymer particles is in the range of from 1:1 to 3.5:1;

the weight-to-weight ratio of the first multistage polymer particles to the second multistage polymer particles is in the range of from 0.15:1 to 1.0:1;

the z-average particle size of the first multistage polymer particles is in the range of from 200 nm to 2000 nm; and the z-average particle size of the second multistage polymer particles is in the range of from 300 nm to 750 nm; and wherein the first multistage polymer particles do not have a layer of a film forming polymeric binder superposing the polymeric shell.

2. The composition of claim 1 wherein the weight-to-weight ratio of the film forming polymeric binder to the sum of the structural units of monomers of the water-occluded core and the polymeric shell in the second multistage polymer particles is in the range of from 1.5:1 to 2.5:1; and the weight-to-weight ratio of structural units of monomers of the water-occluded core to the polymeric shell in the first and second multistage polymer particles is in the range of 1:12 to 1:16; wherein the z-average particle size of the first multistage polymer particles is in the range of from 350 nm to 500 nm or in the range of from 950 nm to 2000 nm; the z-average particle size of the second multistage polymer particles is in the range of from 450 nm to 600 nm; and the weight-to-weight ratio of the first multistage polymer particles to the second multistage polymer particles is in the range of from 0.30:1 to 0.7:1.

3. The composition of claim 2 wherein the z-average particle size of the first multistage polymer particles is in the range of from 375 nm to 425 nm; the z-average particle size of the second multistage polymer particles is in the range of from 475 nm to 550 nm; and the weight-to-weight ratio of the first multistage polymer particles to the second multistage polymer particles is in the range of from 0.50:1 to 0.65:1.

4. The composition of claim 3 which further comprises a rheology modifier, a dispersant, a defoamer, a surfactant, an inorganic pigment which is ZnO, and less than 1 weight percent $TiO_2$, based on the weight of the composition.

5. The composition of claim 3 which further comprises a rheology modifier, a dispersant, a defoamer, a surfactant, an inorganic pigment which is ZnO, and 0 weight percent $TiO_2$.

6. The composition of claim 1 which further comprises a rheology modifier and one or more components selected from the group consisting of a dispersant, a defoamer, a surfactant, a coalescent, an extender, and an inorganic pigment.

7. The composition of claim 1 wherein the weight-to-weight ratio of the film forming polymeric binder to the sum of the structural units of monomers of the water-occluded core and the polymeric shell in the second multistage polymer particles is in the range of from 1.5:1 to 2.5:1; and the weight-to-weight ratio of structural units of monomers of the water-occluded core to the polymeric shell in the first and second multistage polymer particles is in the range of 1:12 to 1:16; wherein the z-average particle size of the first multistage polymer particles is in the range of from 350 nm to 500 nm or in the range of from 950 nm to 2000 nm; the z-average particle size of the second multistage polymer particles is in the range of from 450 nm to 600 nm; and the weight-to-weight ratio of the first multistage polymer particles to the second multistage polymer particles is in the range of from 0.30:1 to 0.7:1.

8. A waterborne composition comprising an aqueous dispersion of first and second multistage polymer particles, wherein:

the first multistage polymer particles consist of: a) a water-occluded core comprising from 30 to 50 weight percent structural units of a salt of methacrylic acid and from 50 to 70 weight percent structural units of a nonionic monoethylenically unsaturated monomer, based on the weight of structural units of monomers in the water-occluded core; and b) a polymeric shell having a $T_g$ in the range of from 90° C. to 115° C.; and wherein the second multistage polymer particles comprise a) a water-occluded core comprising from 30 to 50 weight percent structural units of a salt of methacrylic acid and from 50 to 70 weight percent structural units of a nonionic monoethylenically unsaturated monomer, based on the weight of structural units of monomers in the water-occluded core; b) a polymeric shell having a $T_g$ in the range of from 90° C. to 115° C.; and c) a layer of a film forming polymeric binder superposing the polymeric shell, which film forming polymeric binder has a $T_g$ in the range of from −10° C. to 15° C., and comprises structural units of at least one monoethylenically unsaturated monomer, wherein the film forming polymeric binder is an acrylic or styrene-acrylic binder;

wherein each of the nonionic monoethylenically unsaturated monomers of the water-occluded cores of the first and second multistage polymer particles are one or more acrylates or methacrylates selected from the group consisting of as methyl acrylate, ethyl acrylate, n-butyl acrylate, t-butyl acrylate 2-ethylhexyl acrylate, methyl methacrylate, n-butyl methacrylate, t-butyl methacrylate, isobutyl methacrylate, isobornyl methacrylate, lauryl methacrylate, and cyclohexyl methacrylate; and a monoethylenically unsaturated aromatic compound selected from the group consisting of styrene, α-methylstyrene, and 4-t-butylstyrene;

wherein each of the polymeric shells of the first and second multistage polymer particles comprise from 89 to 93 weight percent structural units of styrene, and from 4 to 5 weight percent structural units of methyl methacrylate, from 0.9 to 2 weight percent structural units of cyclohexyl methacrylate, from 2 to 3 weight percent structural units of methacrylic acid, and from 0.1 to 0.5 weight percent structural units of allyl methacrylate;

wherein the weight-to-weight ratio of structural units of monomers in the water-occluded core to the polymeric shell in the first and second multistage polymer particles is in the range of 1:10 to 1:20;

the weight-to-weight ratio of the film forming polymeric binder to the sum of the polymeric shell and the structural units of monomers in the water-occluded core in the second multistage polymer particles is in the range of from 1.5:1 to 2.5:1;

the weight-to-weight ratio of the first multistage polymer particles to the second multistage polymer particles is in the range of from 0.15:1 to 1.0:1;

the z-average particle size of the first multistage polymer particles is in the range of from 200 nm to 2000 nm; and the z-average particle size of the second multistage polymer particles is in the range of from 300 nm to 750 nm.

9. The composition of claim 8 wherein the weight-to-weight ratio of structural units of monomers of the water-occluded core to the polymeric shell in the first and second multistage polymer particles is in the range of 1:12 to 1:16; the z-average particle size of the first multistage polymer particles is in the range of from 350 nm to 500 nm or in the range of from 950 nm to 2000 nm; the z-average particle size of the second multistage polymer particles is in the range of from 450 nm to 600 nm; and the weight-to-weight ratio of the first multistage polymer particles to the second multistage polymer particles is in the range of from 0.30:1 to 0.7:1.

10. The composition of claim 9 wherein the z-average particle size of the first multistage polymer particles is in the range of from 375 nm to 425 nm; the z-average particle size of the second multistage polymer particles is in the range of from 475 nm to 550 nm; and the weight-to-weight ratio of the first multistage polymer particles to the second multistage polymer particles is in the range of from 0.50:1 to 0.65:1.

11. The composition of claim 8 which further comprises a rheology modifier, a dispersant, a defoamer, a surfactant, ZnO, and less than 1 weight percent $TiO_2$, based on the weight of the composition.

12. The composition of claim 8 which further comprises a rheology modifier, a dispersant, a defoamer, a surfactant, ZnO, and less than 1 weight percent $TiO_2$, based on the weight of the composition; wherein the weight-to-weight ratio of structural units of monomers of the water-occluded core to the polymeric shell in the first and second multistage polymer particles is in the range of 1:12 to 1:16; the z-average particle size of the first multistage polymer particles is in the range of from 350 nm to 500 nm or in the range of from 950 nm to 2000 nm; the z-average particle size of the second multistage polymer particles is in the range of from 450 nm to 600 nm; and the weight-to-weight ratio of the first multistage polymer particles to the second multistage polymer particles is in the range of from 0.30:1 to 0.7:1.

* * * * *